United States Patent
Pollari

(10) Patent No.: US 9,842,226 B2
(45) Date of Patent: *Dec. 12, 2017

(54) LOCATIVE SOCIAL NETWORKING USING A MOBILE DEVICE

(71) Applicant: Empire Technology Development LLC, Wilmington, DE (US)

(72) Inventor: Esa Tapani Pollari, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/830,268

(22) Filed: Aug. 19, 2015

(65) Prior Publication Data

US 2015/0356318 A1   Dec. 10, 2015

Related U.S. Application Data

(63) Continuation of application No. 14/321,300, filed on Jul. 1, 2014, now Pat. No. 9,148,760, which is a
(Continued)

(51) Int. Cl.
*H04L 1/00* (2006.01)
*G06F 21/62* (2013.01)
(Continued)

(52) U.S. Cl.
CPC ......... *G06F 21/6245* (2013.01); *G06Q 30/02* (2013.01); *G06Q 30/0267* (2013.01);
(Continued)

(58) Field of Classification Search
CPC ....... H04W 4/023; H04W 4/02; H04W 68/00; H04W 12/06; H04L 63/0884; G06F 21/6245
(Continued)

(56) References Cited

U.S. PATENT DOCUMENTS

| 5,937,348 A | 8/1999 | Cina et al. |
| 7,831,684 B1 | 11/2010 | Lawler et al. |

(Continued)

FOREIGN PATENT DOCUMENTS

| CN | 101702795 A | 5/2010 |
| CN | 101771677 A | 7/2010 |

(Continued)

OTHER PUBLICATIONS

Zhan, et al. "Ranging Method and Accuracy Analysis Based on RSSI of Wireless Sensor Network." Telecommunication Engineering (2010), vol. 50 No. 4. Entire document.
(Continued)

*Primary Examiner* — Sai-Ming Chan
(74) *Attorney, Agent, or Firm* — Amin, Turocy & Watson, LLP

(57) ABSTRACT

Technologies are generally described for providing a locative social networking service utilizing wireless access point. In some examples, a method performed under control of a mobile device may include connecting to a wireless local area network, finding at least one other mobile device connected to the wireless local area network and satisfying a predetermined condition, and for each found mobile device, requesting a public user profile associated with the found mobile device, in response to the request, receiving the public user profile associated with the found mobile device, and for each found mobile device from which an associated public user profile is received, transmitting to the found mobile device a public user profile associated with the mobile device.

20 Claims, 8 Drawing Sheets

Related U.S. Application Data continuation of application No. 13/264,675, filed as application No. PCT/US2011/033432 on Apr. 21, 2011, now Pat. No. 8,804,527.

(51) Int. Cl.

| | | |
|---|---|---|
| *H04W 4/02* | (2009.01) | |
| *H04W 68/00* | (2009.01) | |
| *G06Q 30/02* | (2012.01) | |
| *H04W 12/06* | (2009.01) | |
| *H04L 29/06* | (2006.01) | |
| *G06Q 50/00* | (2012.01) | |

(52) U.S. Cl.
CPC ......... *G06Q 50/01* (2013.01); *H04L 63/0884* (2013.01); *H04W 4/02* (2013.01); *H04W 4/023* (2013.01); *H04W 12/06* (2013.01); *H04W 68/00* (2013.01)

(58) Field of Classification Search
USPC .......................................................... 370/236
See application file for complete search history.

(56) References Cited

U.S. PATENT DOCUMENTS

| | | | |
|---|---|---|---|
| 7,890,581 | B2 | 2/2011 | Rao et al. |
| 2005/0281237 | A1 | 12/2005 | Heinonen et al. |
| 2007/0161402 | A1* | 7/2007 | Ng. ......................... H04L 67/06 455/554.2 |
| 2007/0218900 | A1* | 9/2007 | Abhyanker .......... G06Q 10/087 455/435.1 |
| 2007/0273583 | A1 | 11/2007 | Rosenberg |
| 2008/0248801 | A1 | 10/2008 | Fletcher et al. |
| 2009/0177810 | A1 | 7/2009 | Kweon et al. |
| 2009/0181653 | A1 | 7/2009 | Alharayeri |
| 2009/0319663 | A1 | 12/2009 | Giles et al. |
| 2010/0280904 | A1 | 11/2010 | Ahuja |

FOREIGN PATENT DOCUMENTS

| | | |
|---|---|---|
| JP | 2000068887 A | 3/2000 |
| JP | 2000167233 A | 6/2000 |
| JP | 2002058069 A | 2/2002 |
| JP | 2002165009 A | 6/2002 |
| JP | 2005004335 A | 1/2005 |
| JP | 2005519372 A | 6/2005 |
| JP | 2007110553 A | 4/2007 |
| JP | 2008245113 A | 10/2008 |
| JP | 2009284409 A | 12/2009 |
| JP | 2011066918 A | 3/2011 |
| JP | 2013516705 | 5/2013 |
| WO | 03073304 A1 | 9/2003 |
| WO | 2008086314 A1 | 7/2008 |

OTHER PUBLICATIONS

"Bonjour," Mac Developer Library, accesses at https://developer.apple.com/library/mac/documentation/Cocoa/Conceptual/NetServices/Introduction.html, accessed on Sep. 2, 2014, pp. 3.

"Locative media," Wikipedia, accessed at http://web.archive.org/web/20100726010946/http://en.wikipedia.org/wiki/Locative_media, Jul. 21, 2010, pp. 3.

"MAC address," Wikipedia, accessed at http://web.archive.org/web/20110410063741/http://en.wikipedia.org/wiki/MAC_address, Apr. 1, 2011, pp. 5.

"Mobile phone tracking," Wikipedia, accessed at http://web.archive.org/web/20100303090922/http://en.wikipedia.org/wiki/Mobile_phone_tracking, Mar. 3, 2010, pp. 5.

"Mobile Web Server (Symbian OS)," Wikipedia, accessed at http://web.archive.org/web/20100909112301/http://en.wikipedia.org/wiki/Mobile_Web_Server_(Symbian_OS), Jul. 5, 2010, pp. 2.

"Received signal strength indication," Wikipedia, accessed at http://web.archive.org/web/20100214061451/http://en.wikipedia.org/wiki/Received_signal_strength_indication, Feb. 9, 2010, pp. 2.

"Wi-Fi Direct," Wikipedia, accessed at http://web.archive.org/web/20100127032505/http://en.wikipedia.org/wiki/Wi-Fi_Direct, Jan. 19, 2010, pp. 3.

"Wireless LAN," Wikipedia, accessed at http://web.archive.org/web/20101015234802/http://en.wikipedia.org/wiki/Wlan, Oct. 14, 2010, pp. 5.

"Wireless Wide Area Network," Wikipedia, accessed at http://web.archive.org/web/20090213164343/http://en.wikipedia.org/wiki/WWAN, Sep. 23, 2008, pp. 2.

Amichai-Hamburger, Y., et al., ""On the Internet No One Knows I'm an Introvert": Extroversion, Neuroticism, and Internet Interaction," CyberPsychology & Behavior, vol. 5, No. 2, pp. 125-128, Mary Ann Liebert, Inc. (2002).

Feldmann, S., "An indoor Bluetooth-based positioning system: concept, Implementation and experimental evaluation," Proceedings of the International Conference on Wireless Networks, pp. 5 (2003).

Kotanen, A., et al., "Experiments on Local Positioning with Bluetoothm," International Conference on Information Technology: Coding and Computing [Computers and Communications], pp. 297-303, IEEE (2003).

Milner, C., "Social Networking Can Increase Feelings of Isolation, Students Say," The Epoch Times, accessed at http://web.archive.org/web/20101015061300/http://www.theepochtimes.com/n2/content/view/44049, Oct. 11, 2010, pp. 2.

"Nokia Sensor," Nokia, accessed at http://web.archive.org/web/20101114160409/http://www.nokia-asia.com/support/download-software/nokia-sensor, Accessed on Sep. 2, 2014 pp. 1.

Presser, A., et al., "UPnP™ Device Architecture 1.1," UPnP Forum, pp. 136 (2008).

International Search Report for International Patent Application No. PCT/US2011/033432 dated Jul. 28, 2011.

Office Action dated Feb. 5, 2015 for U.S. Appl. No. 14/321,300, 22 pages.

Notice of Allowance dated Jun. 16, 2015 for U.S. Appl. No. 14/321,300, 18 pages.

Zhu, "SIP Based Social Networking Services Framework and Mobility Research," China Selected Master Dissertations Full-text Database, part information technology, 2011, 27 pages, No. 3.

* cited by examiner

LOCATIVE SOCIAL NETWORKING USING A MOBILE DEVICE

CROSS REFERENCE TO RELATED APPLICATIONS

This application is a continuation under 35 U.S.C. §120 of, and claims priority to each of, U.S. patent application Ser. No. 14/321,300, (now U.S. Pat. No. 9,148,760) filed on Jul. 1, 2014, and entitled "LOCATIVE SOCIAL NETWORKING USING A MOBILE DEVICE", which is a continuation under 35 U.S.C. §120 of U.S. patent application Ser. No. 13/264,675 (now U.S. Pat. No. 8,804,527), filed on Oct. 14, 2011, and entitled "LOCATIVE SOCIAL NETWORKING USING A MOBILE DEVICE", which is a U.S. National Stage filing under 35 U.S.C. §371 of International Application No. PCT/US2011/033432, filed on Apr. 21, 2011, and entitled "LOCATIVE SOCIAL NETWORKING USING A MOBILE DEVICE". The entireties of the foregoing applications are hereby incorporated by reference herein.

BACKGROUND

Mobile social networking has seen phenomenal growth in the last few years. Mobile device users can create their own profiles, make friends, send and receive messages, and share photos and videos using their mobile devices. There is, however, a negative side to the trend. Critics blame that such a kind of social networking replaces real-life relationships, isolating its most ardent users from real human interaction. In this regard, in order to let the mobile device users enjoy social networking in the true sense of the term, it is necessary to provide face-to-face interaction for the mobile device users.

SUMMARY

In an example, a method performed under control of a mobile device may include connecting to a wireless local area network, finding at least one other mobile device connected to the wireless local area network and satisfying a predetermined condition, and for each found mobile device, requesting a public user profile associated with the found mobile device, in response to the request, receiving the public user profile associated with the found mobile device, and for each found mobile device from which an associated public user profile is received, transmitting to the found mobile device a public user profile associated with the mobile device.

In an example, a method performed under control of a first mobile device may include connecting to a wireless local area network, identifying a second mobile device connected to the wireless network, the second mobile device satisfying a predetermined condition, and exchanging with the second mobile device public user profiles, the public user profiles comprising a first user profile associated with the first mobile device and a second user profile associated with the second mobile device.

In an example, a computer-readable storage medium may include contents, when executed by a processor of a mobile device, which cause the processor to perform a method including connecting to a wireless local area network, finding at least one other mobile device connected to the wireless local area network and satisfying a predetermined condition, and for each found mobile device, requesting a public user profile associated with the found mobile device, in response to the request, receiving the public user profile associated with the found mobile device, and for each found mobile device from which an associated public user profile is received, transmitting to the found mobile device a public user profile associated with the mobile device.

In an example, a mobile device may include a processor and a memory storing instructions for execution by the processor, wherein the instructions, when executed by the processor, cause the processor to perform a method including connecting to a wireless local area network, finding at least one other mobile device connected to the wireless local area network and satisfying a predetermined condition, and for each found mobile device, requesting a public user profile associated with the found mobile device, in response to the request, receiving the public user profile associated with the found mobile device, and for each found mobile device from which an associated public user profile is received, transmitting to the found mobile device a public user profile associated with the mobile device.

In an example, a computing system can include means for connecting to a wireless local area network and means for identifying a second mobile device connected to the wireless local area network, the second mobile device satisfying a predetermined condition. The computing system can further include means for exchanging with the second mobile device public user profiles, the public user profiles comprising a first user profile associated with the first mobile device and a second user profile associated with the second mobile device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
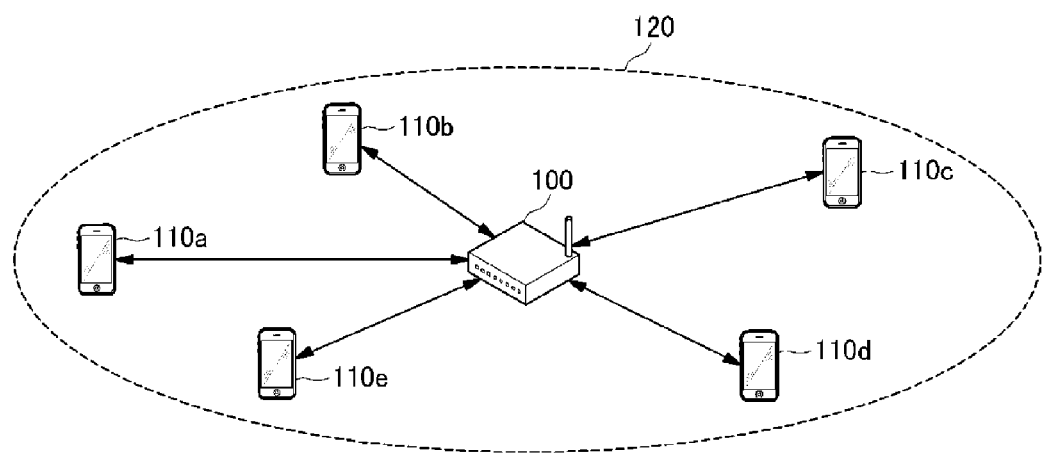
FIG. 1 shows a schematic diagram illustrating an example system employed for providing a locative mobile social networking service.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to providing locative mobile social networking service using a wireless local area network (WLAN) technology, such as Wi-Fi.

Briefly stated, technologies are generally described for providing locative mobile social networking. In some examples, a mobile device may be pre-loaded with a locative social networking application and user profiles, including a public user profile and a private user profile, which are associated with a user of the mobile device. The user may bring the mobile device to a public establishment, venue or other locale that provides a localized area within which mobile devices may interact. In some examples, the localized area may be supported using a wireless local area network (WLAN). When the locative social networking application stored in the mobile device is activated (e.g., by the user of the mobile device), the mobile device may wirelessly search for similarly configured devices in the vicinity. In some examples, similarly configured devices are devices that are loaded or configured with and/or executing the locative social networking application or other application compatible with the locative social networking application.

In some examples, in response to the search by the mobile device, at least some of the similarly configured devices in the vicinity of the mobile device may identify themselves to the mobile device. Having found such devices (i.e., identified the similarly configured devices), the locative social networking application on the mobile device exchanges public user profiles with the found or discovered devices. The results of the exchange of public user profiles may be presented to the respected users of the devices. If one of the exchanged public user profiles sparks the interest of the user of the mobile device, the user may request permission to receive a private user profile associated with (corresponding to) the public user profile that sparked the user's interest. The user who receives the request for the private user profile (i.e., the user's private user profile) can then either authorize or not authorize the sending of the requested private user profile. In response to an authorization to transmit the requested private user profile, the device transmits to the requesting device the requested private user profile.

In some examples, the communication between the mobile device and the searched for and/or found similarly configured devices may be via a wireless access point. In some examples, the wireless access point may be provided as part of a Wi-Fi hotspot. In some other examples, the wireless access point may be provided by a mobile device supporting Wi-Fi Direct protocol.

FIG. 1 shows a schematic diagram illustrating an example system employed for providing a locative mobile social networking service arranged in accordance with at least some embodiments described herein. As depicted, a wireless access point 100 may provide a wireless local area network 120, and provide wireless connectivity to and allow devices in its vicinity, including mobile devices 110a, 110b, 110c, 110d and 110e, to connect to and communicate via wireless local area network 120. Examples of mobile devices include, but are not limited to, a mobile phone, a smart phone, a personal digital assistant (PDA), a tablet computer, a netbook computer, a laptop computer, or other similar portable having communication capability. Although FIG. 1 illustrates that five mobile devices 110a to 110e are connected to wireless local area network 120, one skilled in the art will appreciate that any number of mobile devices can be connected to wireless local area network 120.

In some embodiments, wireless access point 100 may be a Wi-Fi access point, and wireless local area network 120 provided by wireless access point 100 may be a Wi-Fi network. Wireless access point 100 may provide wireless connectivity to devices, including mobile devices, located within a certain distance from wireless access point 100. By way of example, but not limitation, wireless access point 100 may provide Wi-Fi connectivity to mobile devices located within a radius of about 100 ft (30 m) indoors or about 300 ft (90 m) outdoors from wireless access point 100.

In some embodiments, mobile device 110a may provide a locative social networking service. When activated, for example by a user of mobile device 110a, mobile device 110a may connect to wireless local area network 120 and search for similarly configured mobile devices connected to wireless local area network 120. The similarly configured mobile devices may include the mobile devices that provide or support the same locative social networking service as the locative social networking service provided by mobile device 110a. In the example embodiments described with reference to FIG. 1, it is assumed that mobile devices 110b to 110d are the similarly configured mobile devices searched for and found by mobile device 110a. By way of example, but not limitation, mobile device 110a and similarly configured mobile devices 110b to 110d may have software components providing or supporting Wi-Fi capability, relevant service discovery protocols, web components, or application-specific logic and user interfaces in common Some of these software components may be provided by an operating system or application software executing or configured to execute on the mobile device.

By way of example, mobile device 110a (also referred to herein as the "discovering mobile device") may search for and find similarly configured mobile devices 110b to 110d using a service discovery protocol, such as Universal Plug and Play Simple Service Discovery Protocol (UPnP SSDP) or Bonjour protocol. Such service discovery protocols may allow the discovering mobile device to discover similarly configured mobile devices. The discovering mobile device may receive uniform resource locators (URLs) of the discovered or found similarly configured mobile devices, i.e., mobile devices 110b to 110d.

In some embodiments, in cases where mobile devices 110a to 110d are web-enabled (e.g., equipped with a scaled-down web server capability), the discovering mobile device may download (or otherwise request) a user profile from each found mobile device (i.e., mobile devices 110b to 110d) by sending HTTP GET requests to the found mobile devices using the received URLs of the found mobile devices. In response to the HTTP GET request, a found mobile device may transmit its associated user profile to the discovering mobile device. Further, the discovering mobile device may transmit its own user profile to each found mobile device from which a corresponding user profile was received by sending an HTTP PUT. By way of example, but not limitation, the user profiles may have names (e.g., 01-23-45-67-89-ab_public.html or 01-23-45-67-89-ab_private.html) that include a unique MAC address of the corresponding mobile device. The user profiles may be in the format of hypertext markup language (HTML) or extensible markup language (XML).

In some embodiments, the locative social networking application on the discovering mobile device may transmit to each found mobile device a request for a user profile associated with the found mobile device. In some examples, the found mobile device may present an indication of the received request for the user profile along with a request for authorization to transmit the requested user profile. For example, the locative social networking application on the found mobile device may present the request for the user profile on a display device for viewing, for example, by a user of the found mobile device. The user can then either authorize or not authorize the sending of the requested user profile. In response to an authorization to transmit the requested user profile, the found mobile device transmits to the mobile device the requested user profile associated with the found mobile device. In some examples, in response to receiving from the found mobile device the user profile associated with the found mobile device, the mobile device transmits its user profile to the found mobile device from which the user profile associated with the found mobile device was received.

In some embodiments, a discovering mobile device may receive user profiles from none, some or all of the found mobile devices. Similarly, the discovering mobile device may transmit its user profile to each of the found mobile devices from which the discovering mobile device received corresponding user profiles. By way of example, but not a limitation, the discovering mobile device may fail to receive a user profile from a found mobile device due to data transmission error, the found mobile device not transmitting its user profile, for example, because of a user of the found mobile device not granting authorization to transmit the user profile, etc. In cases where a found mobile device cannot transmit the requested user profile, the found mobile device may transmit to the discovering mobile device an appropriate error message (e.g., request-denied message).

In some embodiments, the results of the exchange of user profiles may be presented to the respective users of the mobile devices. In some examples, the locative social networking application on the devices (i.e., discovering mobile device and/or the found mobile devices) may present an indication of the received user profiles on a display device for viewing, for example, by the user of the devices. By way of example, but not limitation, the indication may be a personalized report of the exchanged user profiles. The discovering mobile device may display a personalized report of the user profiles received from the found mobile devices. By way of example, but not limitation, the personalized report may be a list of local hyperlinks to the user profiles received by the discovering mobile device. Moreover, the list may be prioritized according to relevance such as, by way of example, but not limitation, the degree to which the user profile associated with discovering mobile device (i.e., the user profile associated with the user of the discovering mobile device) matches each of the received user profiles, the extent to which the received user profiles match or fulfill preset criteria specified, for example, by the user of the discovering mobile device, and the like. Examples of criteria include, without limitation, personal interests such as music, books, movies, television shows, sports or games, political views, religious views, etc.

In some embodiments, the locative social networking service may provide its user the ability to block selected users. Once blocked, the blocked users may not be able to find the blocking user's device, request or download his/her user profile. By way of example, but not limitation, the locative social networking application on a mobile device may collect the MAC addresses of blocked users' mobile devices in a blacklist stored in a memory of the mobile device. Then, when the mobile device receives a request of its user profile from a requesting mobile device, the mobile device may decide whether the requesting mobile device is a blocked mobile device by referring to the blacklist with the MAC address of the requesting device, and if so, the mobile device may not transmit its user profile to the requesting mobile device. In some embodiments, the mobile device may return an HTTP response with the user-blocked message to the requesting mobile device.

In some embodiments, the user profiles may be public user profiles or private user profiles. A public user profile may include information such as, by way of example, and not limitation, a user's name, nickname, gender, age (exact or range), interests, nationality, hometown, political view, religious view, industry, company, title, work or home address, phone, e-mail, professional qualifications, or any other information allowed to be publicly released by the user. A private user profile may include information such as, by way of example, and not limitation, a user's name, nickname, gender, age, interests, nationality, hometown, political view, religious view, industry, company, title, work or home address, phone, e-mail, professional qualifications, or any other information not allowed to be publicly released by the user.

In some embodiments, the mobile device may wait for authorization before transmitting or providing a requested user profile (a public user profile and/or a private user profile). For example, the found mobile device may provide to its user an indication of the receipt of a request for a public user profile or a private user profile from the discovering mobile device, and wait for a predetermined period of time to receive authorization from its user to transmit or provide the requested public user profile or private user profile, respectively. Likewise, if the discovering mobile device receives a request for either a public user profile or a private user profile from another mobile device, the discovering mobile device may provide to its user an indication of the request for the public user profile or the private user profile, and wait for a predetermined period of time to receive authorization from its user to transmit or provide the requested public user profile or private user profile, respectively.

In some embodiments, the mobile device may transmit or provide a requested public user profile without waiting to receive authorization, for example, from its user. By way of example, execution or activation of the locative mobile social networking service on a mobile device may serve as authorization for the mobile device to transmit or provide a requested public user profile. In some embodiments, the locative mobile social networking service may provide a configurable parameter with which the user can indicate whether or not the user's public profile is to be transmitted or provided without explicit authorization from the user.

In some embodiments, the discovering mobile device may provide its user a personalized report of the received public user profiles. By way of example, but not limitation, after provided with a personalized report of the received public user profiles, the user can then view the personalized report to see if any one or more of the received public user profiles spark his/her interest. If a public user profile sparks the interest of the user, the user can request permission to receive a private user profile associated with (corresponding to) the public user profile which the user is interested in. In such cases, the discovering mobile device may receive from its user an indication of a selection of a public user profile which the user is interested in. Then, in response to the indication of the selection, the discovering mobile device may transmit to a target mobile device (i.e., the mobile device from which the selected or desired public user profile was received), e.g., mobile device 110b, a request for a private user profile associated with selected public user profile, via wireless access point 100. In such cases, the discovering mobile device may send via wireless access point 100 to the target mobile device an HTTP GET request for the private user profile. Similarly, if the public user profile received from the discovering mobile device sparks the interest of a user of a found mobile device, the user of the found mobile device may request permission to receive a private user profile associated with (corresponding to) the public user profile received from the discovering mobile device. In some examples, the device (i.e., the discovering mobile device or the found mobile device) may present an indication of the received request for the private user profile along with a request for authorization to transmit the requested private user profile. By way of example, but not limitation, the locative social networking application on the device may present the request for the private user profile on a display device for viewing, for example, by its user.

In some embodiments, when the request for the private user profile is received on the target mobile device, an application program providing the locative mobile social networking service and executing on the target mobile device may provide an indication of the request on the target mobile device (for example, on a display of the target mobile device). If the target mobile device receives an indication from its user that he/she authorizes sending his/her private user profile to the discovering mobile device (i.e., mobile device 110a), the target mobile device may transmit via wireless access point 100 to the discovering mobile device a permission-granted message followed by the private user profile of the user of the target mobile device. Similarly, if the target mobile device receives an indication from its user that he/she does not authorize sending his/her private user profile to the discovering mobile device, the target mobile device may transmit a request-denied message (and not the private user profile of the user of the target mobile device) to the discovering mobile device via wireless access point 100. In some embodiments, the target mobile device may display the public user profile associated with the discovering mobile device on its display. Then, the user of the target mobile device may look at the public user profile associated with the discovering mobile device to make decision as to whether or not to authorize sending his/her private user to the discovering mobile device.

In some embodiments, the locative social networking service may provide a close proximity search capability or feature, which allows a user to discover other users of the locative social networking service that are in close proximity Continuing the example above, after the one or more similarly configured mobile devices (i.e., mobile devices 110b to 110d) are found by using the service discovery protocol, the user of the discovering mobile device (i.e., mobile device 110a) may want to find other users located in close proximity to the user among the users of the found mobile devices. In such a case, mobile device 110a may further search for a mobile device located within a certain range, e.g., within a range shorter than the Wi-Fi range, from the discovering mobile device, among the found mobile devices located within the Wi-Fi range (typically of a radius of about 100 ft (30 m) indoors or about 300 ft (90 m) outdoors from wireless access point 100). In order to determine whether the found mobile devices are located in close proximity to the discovering mobile device, a short-range peer-to-peer communications technology such as, for example, Bluetooth (having a range of about 32 ft (10 m) or less, typically) may be utilized. By way of example, but not limitation, the discovering mobile device may transmit a request for a close proximity search to each of the found mobile devices via wireless access point 100. If a mobile device among the found mobile devices, e.g., mobile device 110b, gives permission for the close proximity search, mobile device 110b may transmit via wireless access point 100 to mobile device 110a a permission-granted message including a Bluetooth device address of mobile device 110b. Then, mobile device 110a may page mobile device 110b using the received Bluetooth device address based on Bluetooth protocol. If the distance between mobile device 110a and mobile device 110b is shorter than Bluetooth range, the paging may lead to a low-layer Bluetooth connection between mobile device 110a and mobile device 110b. In such a case, the Bluetooth connection may trigger a proximity alarm on both mobile device 110a and mobile device 110b so as to notify users of mobile device 110a and mobile device 110b that they are within the Bluetooth range (e.g., 32 ft) of another. Subsequently, mobile device 110a or mobile device 110b may initiate a Bluetooth disconnect, which ends the close proximity search on both of mobile device 110a and mobile device 110b. If the paging fails to establish a Bluetooth connection between mobile device 110a and mobile device 110b, an automatic time-out may finish the close proximity search.

In some embodiments, an enhanced close proximity search may be further provided to the users. The enhanced close proximity search may employ the Bluetooth received signal strength indication (RSSI), which is indicative of the distance between Bluetooth transceivers (for example, the mobile device and the permitting mobile device). The enhanced close proximity search may entail that the Bluetooth connection is maintained in order for the locative social networking application on each of the mobile devices to take consecutive RSSI readings. In some embodiments, the RSSI readings may be reported to the users of the mobile devices in the form of an audible signal and/or a visual signal. By way of example, but not limitation, an audible signal whose pitch corresponds to the RSSI reading may be provided to the users. By way of example, but not limitation, a Geiger counter-style ticking noise, with the intervals between ticks varying inversely to the RSSI reading, may be provided to the users. By way of example, but not limitation, a visual indicator, such as a circle with a diameter that decreases or increases as the RSSI level rises, may be provided to the users. In some embodiments, the enhanced close proximity search may be terminated by either user or by a time-out, whichever comes first.

In some embodiments, an off-site server (not shown in FIG. 1) may be optionally used to support revenue-generating schemes, such as online advertising or customer loyalty programs.

In some embodiments, a method performed under control of a first mobile device is described herein that includes connecting to a wireless local area network, identifying a second mobile device connected to the wireless local area network, the second mobile device satisfying a predetermined condition, and exchanging with the second mobile device public user profiles, the public user profiles comprising a first user profile associated with the first mobile device and a second user profile associated with the second mobile device. According to an example, exchanging the user profiles is via a wireless access point. In another example, the wireless local area network comprises a Wi-Fi network, and the wireless access point comprises a Wi-Fi access point. In still another example, the predetermined condition is that the second mobile device supports the same locative social networking service as the first mobile device.

In addition, the method can include transmitting to the second mobile device a request for additional information associated with the second user profile, and receiving from the second mobile device the additional information. According to an example, the additional information is a private user profile associated with the second user profile. In another example, transmitting the request for additional information is performed in response to an indication of a desire for the additional information.

In addition, the method can include presenting on the first mobile device the received additional information. In an example, presenting the received additional information comprises displaying the received additional information on a display device. In another example, presenting the received additional information comprises displaying at least a portion of the received additional information on a display device.

Although it is illustrated in FIG. 1 that a single wireless access point, i.e., wireless access point 100, provides the wireless connectivity to the multiple mobile devices, those skilled in the art will appreciate that two or more wireless access points may be employed to provide a wider range of wireless connectivity. In such a case, the wireless access points may be connected to one another by a switch or a router.

Figure 2:
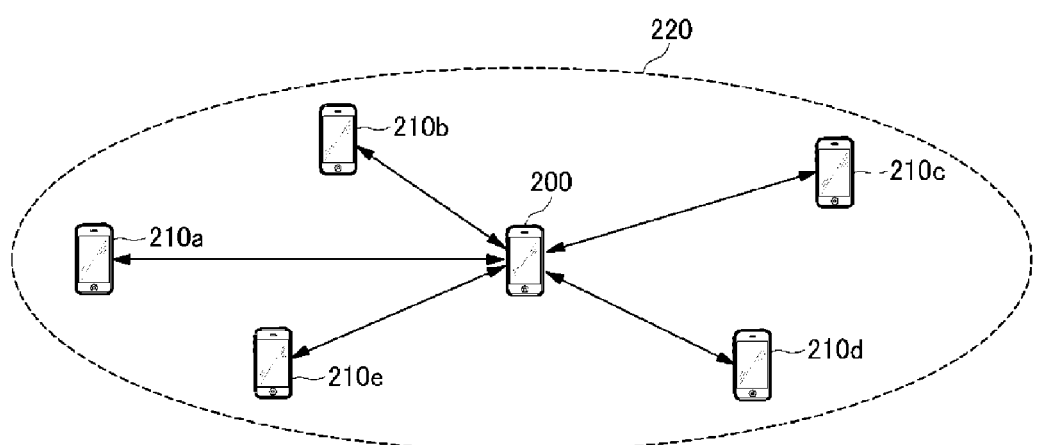
FIG. 2 shows a schematic diagram illustrating another example system employed for providing a locative mobile social networking service.

FIG. 2 shows a schematic diagram illustrating another example system employed for providing a locative mobile social networking service arranged in accordance with at least some embodiments described herein. Referring to FIG. 2, a mobile device 200 that support Wi-Fi Direct protocol may serve as a wireless access point providing wireless connectivity to multiple mobile devices 210a, 210b, 210c, 210d and 210e. By way of example, but not limitation, mobile device 200 and 210a to 210e may include, but not limited to, a mobile phone, a smart phone, a personal digital assistant (PDA), a tablet computer, a netbook computer, a laptop computer, or other similar portable having communication capability. Although FIG. 2 illustrates that five mobile devices 210a to 210e are connected to a wireless local area network 220 via mobile device 200, one skilled in the art will appreciate that any number of mobile devices can be connected to wireless local area network 220 via mobile device 200.

In comparison with the embodiments explained with reference to FIG. 1, the example system in FIG. 2 may employ mobile device 200, which supports Wi-Fi Direct protocol, as a wireless access point instead of a Wi-Fi hotspot. Since it will be readily understood by those skilled in the art that other details may be generally same as in the embodiments explained with reference to FIG. 1, they will not be described in any further detail so as not to unnecessarily obscure the description.

Figure 3:
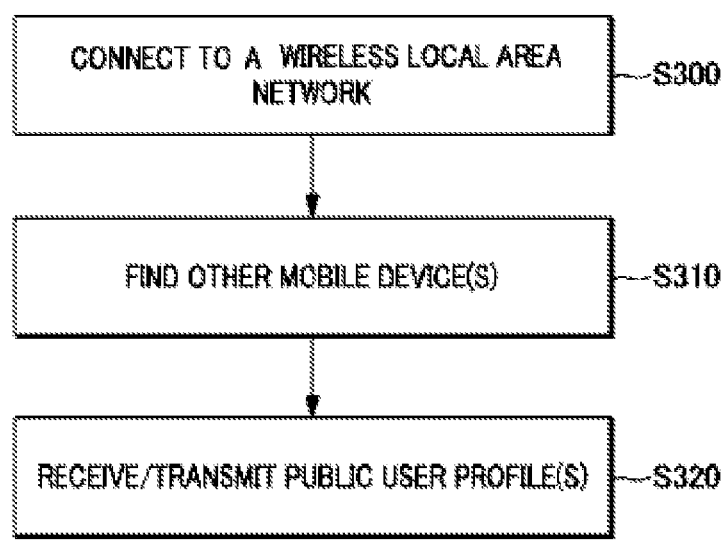
FIG. 3 shows an example flow diagram of a process for exchanging public user profiles among mobile devices.

FIG. 3 shows an example flow diagram of a process for exchanging public user profiles among mobile devices arranged in accordance with at least some embodiments described herein. The process in FIG. 3 may be implemented using, for example, any of the mobile devices discussed above. An example process may include one or more operations, actions, or functions as illustrated by one or more of blocks S300, S310, and/or S320. Although illustrated as discrete blocks, various blocks may be divided into additional blocks, combined into fewer blocks, or eliminated, depending on the desired implementation. Processing may begin at block S300.

At block S300, a mobile device may connect to a wireless local area network. By way of example, but not limitation, the mobile device may connect to a wireless local area network via a wireless access point. By way of example, but not limitation, the wireless local area network includes a Wi-Fi network, and the wireless access point includes a Wi-Fi access point. By way of example, but not limitation, the Wi-Fi access point includes a mobile device supporting Wi-Fi Direct protocol. Processing may continue from block S300 to block S310.

At block S310, the mobile device may search for and find other mobile devices connected to the wireless local area network that satisfy a predetermined condition. In some embodiments, the predetermined condition may include whether the other mobile devices support a locative social networking service supported by the mobile device.

In some embodiments, the mobile device may find other mobile devices that satisfy the predetermined condition by transmitting a request using a service discovery protocol. By way of example, but not limitation, the service discovery protocol may be any one selected from a group consisting of Universal Plug and Play Simple Service Discovery Protocol (UPnP SSDP) and Bonjour protocol. In such a case, the mobile device may receive uniform resource locators (URLs) of the other mobile devices that satisfy the predetermined condition. Processing may continue from block S310 to block S320.

At block S320, the mobile device and each of the other mobile devices that satisfy the predetermined condition may exchange public user profiles with one another. In some embodiments, the mobile device may request a public user profile associated with the found mobile device, and receive the public user profile associated with the found mobile device in response to the request. In some embodiments, the locative social networking application on the mobile device may exchange public user profiles with the found or discovered mobile devices. For example, the locative social networking application on the mobile device may transmit to each found mobile device a request for a public user profile associated with the found mobile device.

In an example, a computing system can include means for connecting, e.g., S300, to a wireless local area network and means for identifying, e.g., S310, a second mobile device connected to the wireless local area network, the second mobile device satisfying a predetermined condition. The computing system can further include means for exchanging, e.g., S320, with the second mobile device public user profiles, the public user profiles comprising a first user profile associated with the first mobile device and a second user profile associated with the second mobile device.

In some examples, the found mobile devices may present an indication of the received request for the public user profile along with a request for authorization to transmit the requested public user profile. For example, the locative social networking application on the found mobile device may present the request for the public user profile on a display device for viewing, for example, by a user of the found mobile device. The user can then either authorize or not authorize the sending of the requested public user profile. In response to an authorization to transmit the requested public user profile, the found mobile device may transmit to the mobile device the requested public user profile associated with the found mobile device. In some examples, in response to receiving a public user profile from a found mobile device, the mobile device may transmit its public user profile to the found mobile device from which a public user profile associated with the found mobile device was received. The results of the exchange of public user profiles may be presented to the respective users of the devices. In some examples, the locative social networking application on the device (i.e., the mobile device or the found mobile device) may present an indication of the received public user profiles on a display device for viewing, for example, by the user of the device. For example, the indication may be a personalized report of the exchanged public user profiles. In some examples, the personalized report may be based at least on a priority. In some examples, the priority may be based on a comparison of the received public user profiles with an interest of the user of the mobile device. In some examples, the priority may be based on a determination of whether information in the received public user profiles satisfies certain specified criteria. In some examples, the criteria may be specified by the user of the mobile device.

In some embodiments, in cases where the mobile device and the other mobile devices that satisfy the predetermined condition are web-enabled (i.e., equipped with a scaled-down web server capability), the mobile device may send HTTP GET requests to the other mobile devices based on the received URLs of the other mobile devices. In response to the HTTP GET requests, the other mobile devices may transmit the user profiles associated therewith to the mobile device. Further, the mobile device may send HTTP PUT requests to the other mobile devices based on the received URLs so as to transmit its own user profile to the other mobile devices.

Figure 4:
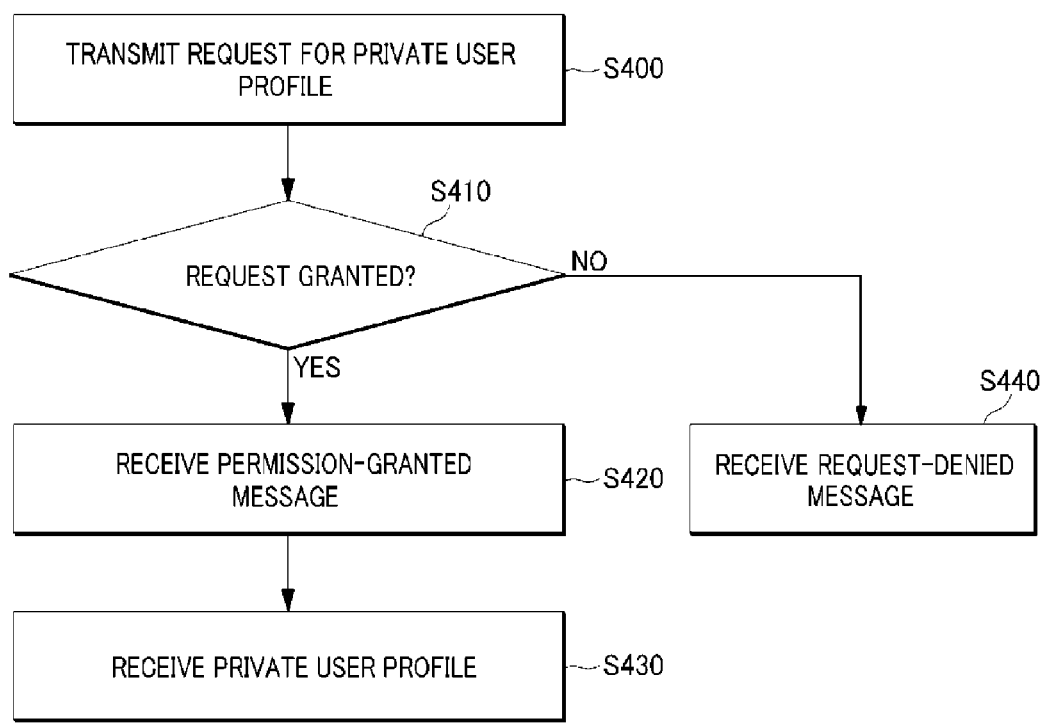
FIG. 4 shows an example flow diagram of a process for exchanging private user profiles among mobile devices.

FIG. 4 shows an example flow diagram of a process for exchanging private user profiles among mobile devices arranged in accordance with at least some embodiments described herein. Particularly, FIG. 4 illustrates an example process for exchanging private user profiles among mobile devices from the reference of a mobile device requesting a private user profile associated with a target mobile device.

The process in FIG. 4 may be implemented using, for example, any of the mobile devices discussed above. An example process may include one or more operations, actions, or functions as illustrated by one or more of blocks S400, S410, S420, S430, and/or S440. Although illustrated as discrete blocks, various blocks may be divided into additional blocks, combined into fewer blocks, or eliminated, depending on the desired implementation. Processing may begin at block S400.

At block S400, a mobile device may transmit via a wireless access point a request for a private user profile to a target mobile device. In some embodiments, the mobile device and the target mobile device may have previously exchanged the public user profiles with each other. In some embodiments, the target mobile device may be designated by the mobile device based on a user's indication of a selection of a target mobile device.

If the target mobile device grants the request for the private user profile (block S410), the mobile device may receive a permission-granted message from the target mobile device via the wireless access point (block S420). Then, the mobile device may receive via the wireless access point the private user profile associated with the target mobile device (block S430).

If the target mobile device refuses the request for the private user profile (block S410), the mobile device may receive a request-denied message from the target mobile device via the wireless access point (block S440).

Figure 5:
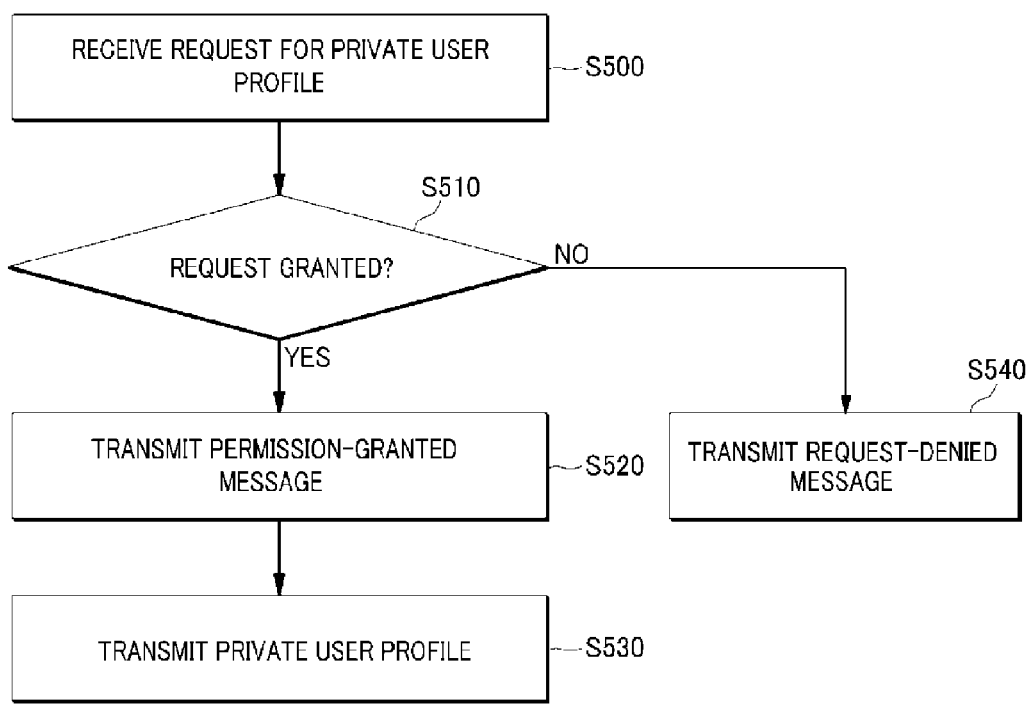
FIG. 5 shows an example flow diagram of a process for exchanging private user profiles among mobile devices.

FIG. 5 shows an example flow diagram of a process for exchanging private user profiles among mobile devices arranged in accordance with at least some embodiments described herein. Particularly, FIG. 5 illustrates an example process for exchanging private user profiles among mobile devices from the reference of a mobile device receiving a request for a private user profile from a requesting mobile device.

The process in FIG. 5 may be implemented using, for example, any of the mobile devices discussed above. An example process may include one or more operations, actions, or functions as illustrated by one or more of blocks S500, S510, S520, S530, and/or S540. Although illustrated as discrete blocks, various blocks may be divided into additional blocks, combined into fewer blocks, or eliminated, depending on the desired implementation. Processing may begin at block S500.

At block S500, a mobile device may receive via a wireless access point a request for a private user profile of the mobile device from a requesting mobile device. In some embodiments, the mobile device and the requesting mobile device may have previously exchanged the public user profiles with each other.

If the mobile device grants the request for the private user profile (block S510), the mobile device may transmit a permission-granted message to the requesting mobile device via the wireless access point (block S520). Then, the mobile device may transmit via the wireless access point the private user profile associated with the mobile device (block S530).

If the mobile device refuses the request for the private user profile (block S510), the mobile device may transmit a request-denied message to the requesting mobile device via the wireless access point (block S540).

Figure 6:
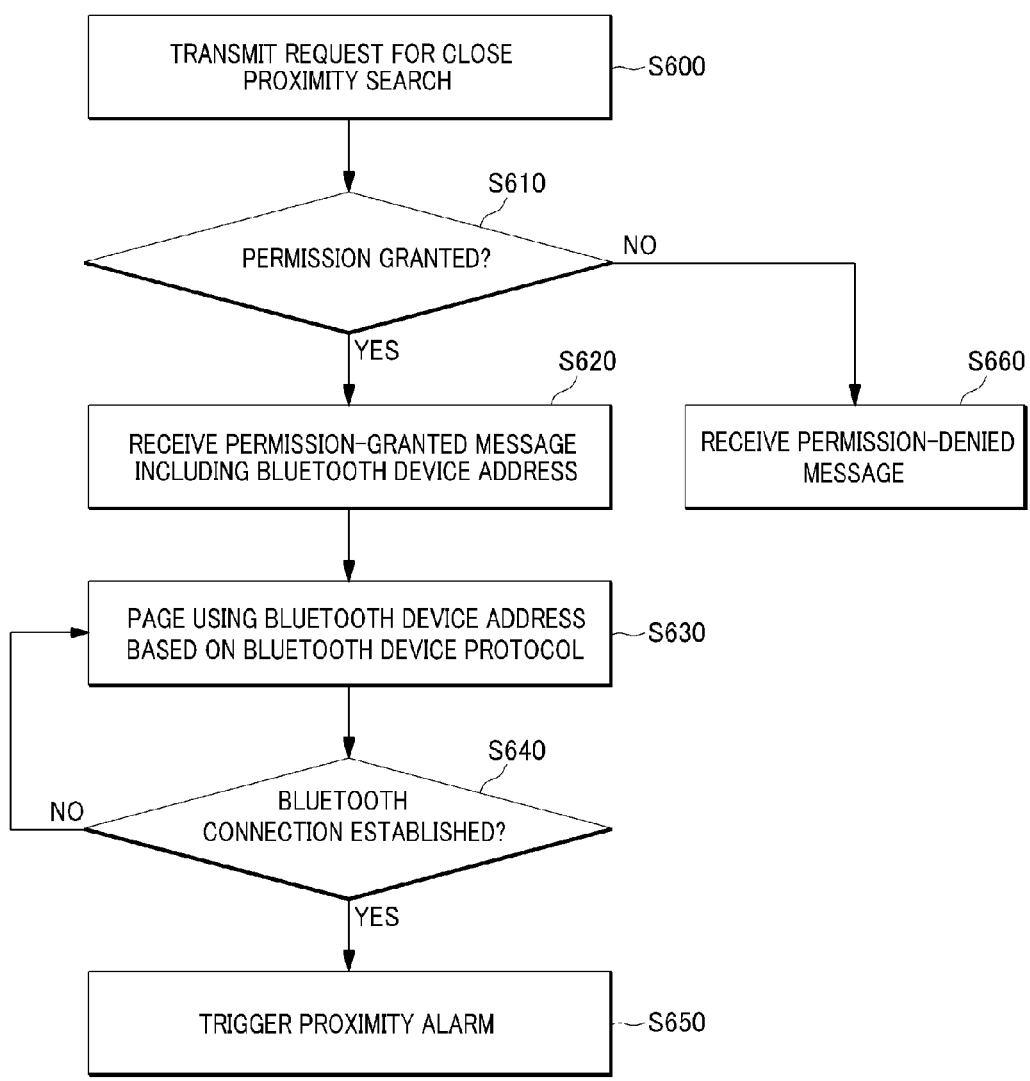
FIG. 6 shows an example flow diagram of a process for searching mobile devices in close proximity.

FIG. 6 shows an example flow diagram of a process for searching mobile devices in close proximity arranged in accordance with at least some embodiments described herein. By way of example, but not limitation, the close proximity search may be conducted using a short-range peer-to-peer communications technology such as Bluetooth.

The process in FIG. 6 could be implemented using, for example, any of the mobile devices discussed above. An example process may include one or more operations, actions, or functions as illustrated by one or more of blocks S600, S610, S620, S630, S640, S650, and/or S660. Although illustrated as discrete blocks, various blocks may be divided into additional blocks, combined into fewer blocks, or eliminated, depending on the desired implementation. Processing may begin at block S600.

At block S600, a mobile device may transmit a request for a close proximity search to at least one other mobile device via a wireless access point. If one of the at least one other mobile device gives permission for the close proximity search at block S610, the mobile device may receive a permission-granted message including a Bluetooth device address of the permitting mobile device via the wireless access point (block S620). Otherwise, the mobile device may receive a permission-denied message (block S660).

After receiving the permission-granted message at block S620, the mobile device may page the permitting mobile device using the received Bluetooth device address based on Bluetooth protocol (block S630). If the distance between the mobile device and the permitting mobile device is shorter than Bluetooth range, which is typically 32 ft (10 m) or less, the paging may lead to a low-layer Bluetooth connection between the mobile device and the permitting mobile device.

If the Bluetooth connection is established between the mobile device and the permitting mobile device (block S640), the Bluetooth connection may trigger a proximity alarm on both of the mobile device and the permitting mobile device so as to notify users thereof that they are within the Bluetooth range (e.g., 32 ft) of another (block S650). If the Bluetooth connection is not established between the mobile device and the permitting mobile device (block S640), the process may continue to block S630 again.

Figure 7:
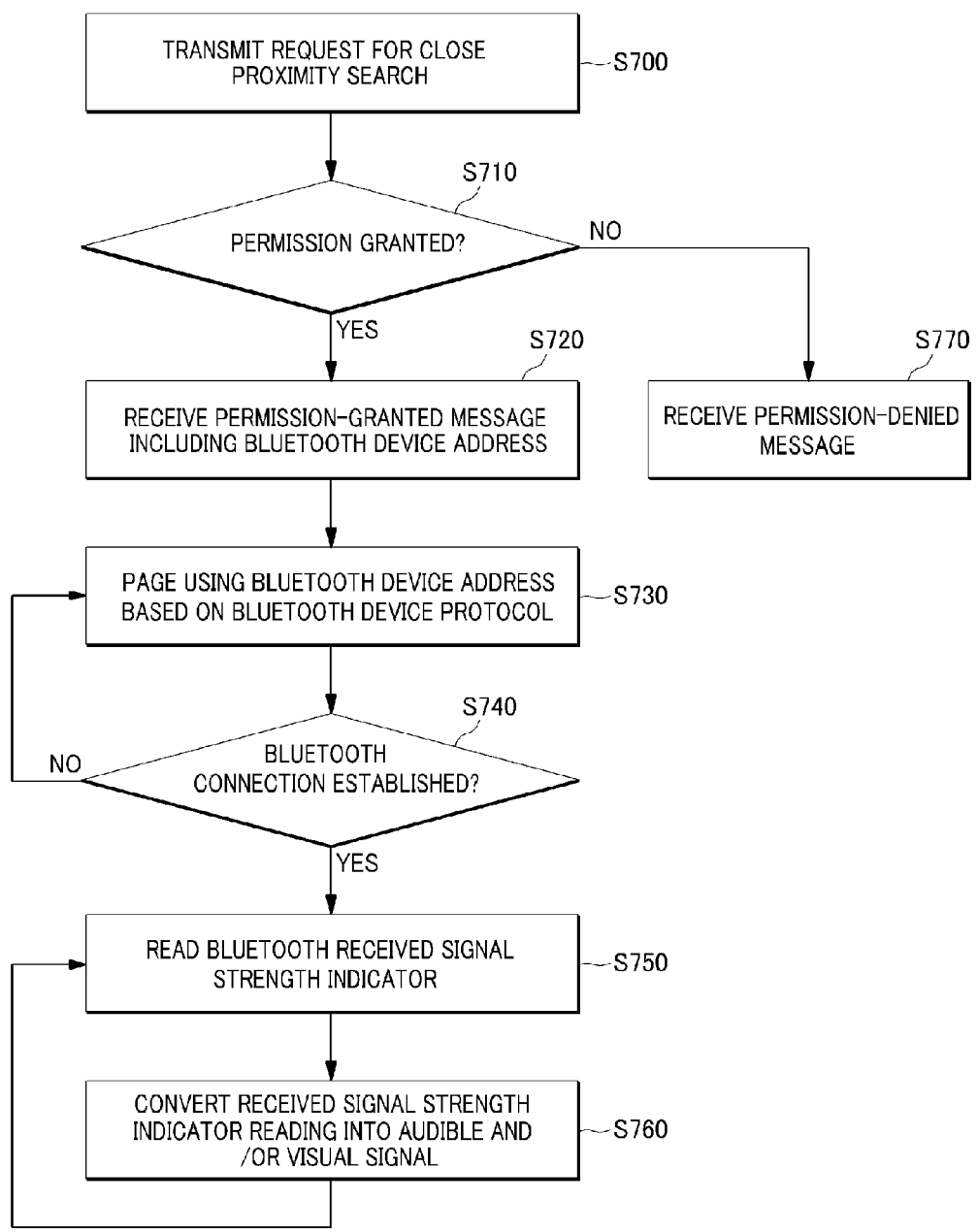
FIG. 7 shows an example flow diagram of another process for searching mobile devices in close proximity.

FIG. 7 shows an example flow diagram of another process for searching mobile devices in close proximity. By way of example, but not limitation, the close proximity search may be conducted using a short-range peer-to-peer communications technology such as Bluetooth.

The process in FIG. 7 could be implemented using, for example, any of the mobile devices discussed above. An example process may include one or more operations, actions, or functions as illustrated by one or more of blocks S700, S710, S720, S730, S740, S750, S760 and/or S770. Although illustrated as discrete blocks, various blocks may be divided into additional blocks, combined into fewer blocks, or eliminated, depending on the desired implementation. Processing may begin at block S700.

At block S700, a mobile device may transmit a request for a close proximity search to at least one other mobile device via a wireless access point. If one of the at least one other mobile device gives permission for the close proximity search at block S710, the mobile device may receive a permission-granted message including a Bluetooth device address of the permitting mobile device via the wireless access point (block S720). Otherwise, the mobile device may receive a permission-denied message (block S770).

After receiving the permission-granted message at block S720, the mobile device may page the permitting mobile device using the received Bluetooth device address based on Bluetooth protocol (block S730). If the distance between the mobile device and the permitting mobile device is shorter than Bluetooth range, which is typically 32 ft (10 m) or less, the paging may lead to a low-layer Bluetooth connection between the mobile device and the permitting mobile device.

If the Bluetooth connection is established between the mobile device and the permitting mobile device (block S740), the mobile device may read Bluetooth received signal strength indication (RSSI), which is indicative of the distance between the mobile device and the permitting mobile device (block S750), and then the mobile device may convert the RSSI reading into an audible and/or visual signal (block S760). The mobile device may perform blocks S750 and S760 repeatedly as long as Bluetooth connection is maintained, in order for locative social networking application on each of the mobile device and the permitting mobile device to take consecutive RSSI readings. On the other hand, if the Bluetooth connection is not established between the mobile device and the permitting mobile device at block S740, the process may continue to block S730 again.

By way of example, but not limitation, the audible and/or visual signal may include an audible signal whose pitch corresponds to the RSSI reading. By way of example, but not limitation, the audible and/or visual signal may include a Geiger counter-style ticking noise, with the intervals between ticks varying inversely to the RSSI reading. By way of example, but not limitation, the audible and/or visual signal may include a visual indicator, such as a circle with a diameter that decreases or increases as the RSSI level rises.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
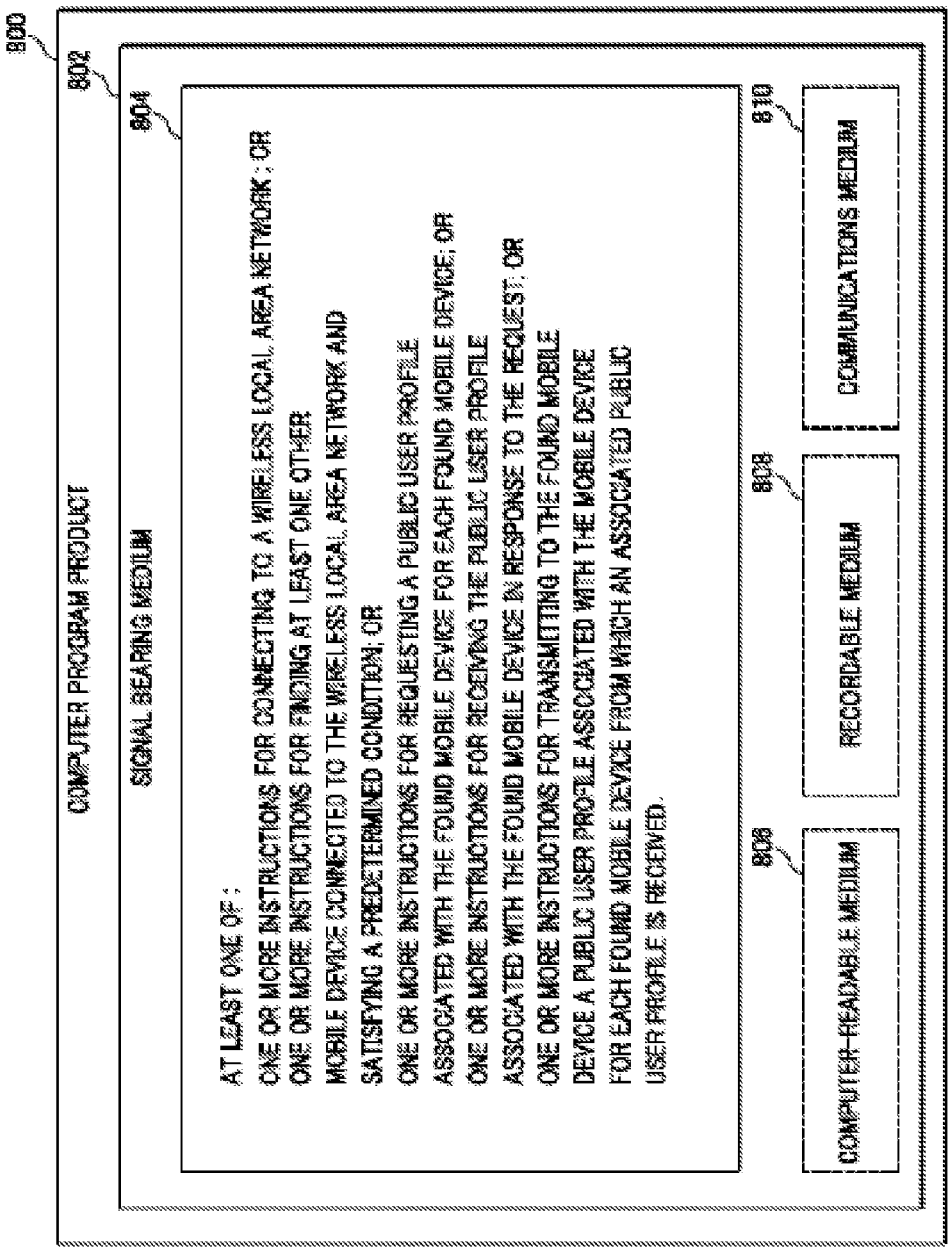
FIG. 8 illustrates computer program products that can be utilized to provide locative mobile social networking.

FIG. 8 illustrates computer program products 800 that can be utilized to provide locative mobile social networking in accordance with at least some embodiments described herein. Computer program product 800 may include a signal bearing medium 802. Signal bearing medium 802 may include one or more instructions 804 that, when executed by, for example, a processor, may provide the functionality described above with respect to FIGS. 1-7. By way of example, instructions 804 may include: one or more instructions for connecting to a wireless local area network; one or more instructions for finding at least one other mobile device connected to the wireless local area network and satisfying a predetermined condition; one or more instructions for requesting a public user profile associated with the found mobile device for each found mobile device; one or more instructions for receiving the public user profile associated with the found mobile device in response to the request; one or more instructions for transmitting to the found mobile device a public user profile associated with the mobile device for each found mobile device from which an associated public user profile is received. Thus, for example, referring to the system of FIG. 1, mobile device 110a may undertake one or more of the blocks shown in FIG. 6 in response to instructions 804.

In some implementations, signal bearing medium 802 may encompass a computer-readable medium 806, such as, but not limited to, a hard disk drive (HDD), a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communication link, a wireless communication link, etc.). Thus, for example, computer program product 800 may be conveyed to one or more modules of mobile device 110a by an RF signal bearing medium 802, where the signal bearing medium 802 is conveyed by a wireless communications medium 810 (e.g., a wireless communications medium conforming with the IEEE 802.11 standard).

Figure 9:
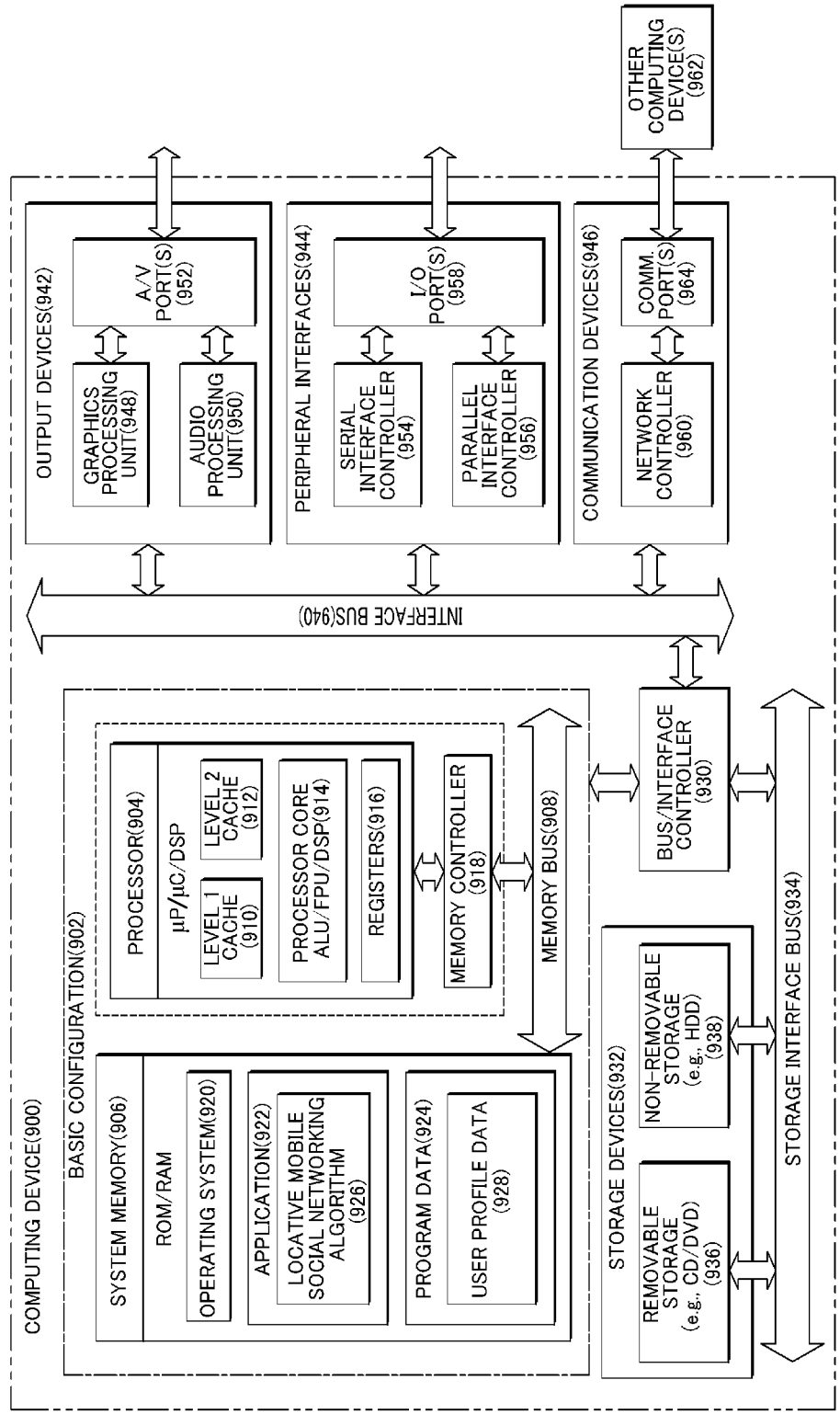
FIG. 9 is a block diagram illustrating an example computing device that can be utilized to provide locative mobile social networking, all arranged in accordance with at least some embodiments described herein.

FIG. 9 is a block diagram illustrating an example computing device 900 that can be utilized to provide locative mobile social networking in accordance with at least some embodiments described herein. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (μP), a microcontroller (μC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations, memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924.

Application 922 may include a locative mobile social networking algorithm 926 that is arranged to perform the functions as described herein including those described previously with respect to FIGS. 1-8. Program data 924 may include user profile data 928, including public user profile data and/or public user profile data that may be useful for providing locative mobile social networking as is described herein. In some embodiments, application 922 may be arranged to operate with program data 924 on operating system 920 such that locative mobile social networking services may be provided. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"), the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, comprising:
sending, by a system that comprises a processor, a first request to a first mobile device connected to a wireless local area network, wherein the first request comprises a first permission to receive first data;
receiving, by the system, the first data based on a first authorization from the first mobile device, wherein the first data comprises first user profile data that represents first profile information about a first user identity;
sending, by the system, a second request to a second mobile device connected to the wireless local area network, wherein the second request comprises a second permission to receive second data;
receiving, by the system, the second data based on a second authorization from the second mobile device, wherein the second data comprises second user profile data that represents second profile information about a second user identity; and
generating, by the system, a report based on the first data and the second data, wherein the generating comprises displaying a first hyperlink to the first user profile data that is authorized by the first mobile device via the first authorization and a second hyperlink to the second user profile data that is authorized by the second mobile device via the second authorization.

2. The method of claim 1, wherein the receiving the first data comprises receiving a uniform resource locator associated with the first mobile device.

3. The method of claim 1, wherein the receiving the first data comprises receiving age data that represents an age of the first user identity or receiving gender data that represents a gender of the first user identity.

4. The method of claim 1, wherein the receiving the first data comprises receiving interest data that represents interests associated with the first user identity.

5. The method of claim 1, wherein the generating the report comprises generating the first hyperlink and generating the second hyperlink.

6. The method of claim 1, wherein the generating the report comprises generating age data that represents respective ages of the first user identity and the second user identity.

7. The method of claim 1, wherein the generating the report comprises generating gender data that represents respective genders of the first user identity and the second user identity.

8. The method of claim 1, further comprising:
sending, by the system, third data to the first mobile device, wherein the third data comprises information about a third user identity.

9. The method of claim 8, wherein the sending the third data comprises sending, to the first mobile device, third user profile data that represents third profile information about the third user identity.

10. The method of claim 8, wherein the sending the third data comprises sending, to the first mobile device, advertising data that comprises advertisement content.

11. A system, comprising:
a memory to store instructions; and
a processor, coupled to the memory, to execute or facilitate execution of the instructions to at least transmit a request for data to a mobile device connected to a network, receive the data in response to an authorization associated with the mobile device, transmit another request for other data to other mobile device connected to the network, receive the other data in response to other authorization associated with the other mobile device, and generate a report based on the data and the other data, wherein the data comprises user profile data that represents profile information related to a user identity, wherein the other data comprises other user profile data that represents other profile information related to other user identity, wherein the report displays a link to the user profile data that is authorized by the mobile device in response to the authorization, and wherein the report displays another link to the other user profile data that is authorized by the other mobile device in response to the other authorization.

12. The system of claim 11, wherein the data comprises a network address associated with the user profile data.

13. The system of claim 11, wherein the data comprises user identification data representative of identification information associated with the user identity.

14. The system of claim 11, wherein the data comprises user interest data representative of interests associated with the user identity.

15. The system of claim 11, wherein the link includes a hyperlink to the user profile data and the other link includes another hyperlink to the other user profile data.

16. The system of claim 11, wherein the report comprises age data representative of respective ages associated with the user identity and the other user identity.

17. The system of claim 11, wherein the report comprises gender data representative of respective genders associated with the user identity and the other user identity.

18. A non-transitory computer readable storage device comprising executable instructions that, in response to execution, cause a system that comprises a processor to perform operations comprising:
transmitting a first request for first profile data to a first mobile device connected to a network device of a wireless network, wherein the first profile data represents first profile information regarding a first user identity;
receiving the first profile data in response to a first authorization from the first mobile device;
transmitting a second request for second profile data to a second mobile device connected to the network device of the wireless network, wherein the second profile data represents second profile information regarding a second user identity;
receiving the second profile data in response to a second authorization from the second mobile device; and
generating a report that displays a first hyperlink to the first profile data that is authorized in response to the first authorization from the first mobile device, and displays a second hyperlink to the second profile data that is authorized in response to the second authorization from the second mobile device.

19. The non-transitory computer readable storage device of claim 18, wherein the operations further comprise:
transmitting third profile data to the first mobile device, wherein the third profile data represents third profile information regarding a third user identity.

20. The non-transitory computer readable storage device of claim 18, wherein the operations further comprise:
transmitting, to the first mobile device, advertising data that comprises advertisement content.

* * * * *